(12) United States Patent
Choudhury et al.

(10) Patent No.: US 9,949,890 B2
(45) Date of Patent: Apr. 24, 2018

(54) GARMENT WITH REMOTE CONTROLLED VIBRATION ARRAY

(71) Applicants: Sambhu Choudhury, Cincinnati, OH (US); Monika Lalani Rathnayake, Cincinnati, OH (US)

(72) Inventors: Sambhu Choudhury, Cincinnati, OH (US); Monika Lalani Rathnayake, Cincinnati, OH (US)

( * ) Notice: Subject to any disclaimer, the term of this patent is extended or adjusted under 35 U.S.C. 154(b) by 0 days.

(21) Appl. No.: 14/216,909

(22) Filed: Mar. 17, 2014

(65) Prior Publication Data

US 2015/0022328 A1 Jan. 22, 2015

Related U.S. Application Data

(60) Provisional application No. 61/798,854, filed on Mar. 15, 2013, provisional application No. 61/814,701, filed on Apr. 22, 2013.

(51) Int. Cl.

| A61H 23/00 | (2006.01) |
|---|---|
| H04M 1/00 | (2006.01) |
| A61H 1/00 | (2006.01) |
| H04B 3/36 | (2006.01) |
| G06F 3/041 | (2006.01) |
| G06F 3/01 | (2006.01) |

(Continued)

(52) U.S. Cl.
CPC .............. *A61H 23/00* (2013.01); *A61H 19/00* (2013.01); *G06F 1/163* (2013.01); *G06F 3/016* (2013.01); *G06F 3/0488* (2013.01); *G06F 3/04847* (2013.01); *G06F 21/305* (2013.01); *G08C 17/02* (2013.01); *A61H 2201/165* (2013.01); *A61H 2201/501* (2013.01); *A61H 2201/5002* (2013.01); *G06F 2203/0383* (2013.01); *G06F 2221/2111* (2013.01); *G08C 2201/30* (2013.01); *G08C 2201/42* (2013.01); *H04M 1/72533* (2013.01); *H04M 2250/22* (2013.01)

(58) Field of Classification Search
CPC ......... A61H 23/00; A61H 1/00; H04W 4/008; H04B 3/36; G06F 3/041; G06F 3/01; G06F 3/0488
USPC ........... 340/407.2, 4.1, 4.12, 4.13, 7.6, 7.61; 455/567; 345/159, 173, 160; 700/17, 21, 700/78, 79, 83, 275
See application file for complete search history.

(56) References Cited

U.S. PATENT DOCUMENTS

| 6,930,590 B2 * | 8/2005 | Ling | .................... G09B 21/003 310/319 |
| 7,593,000 B1 * | 9/2009 | Chin | ...................... G06F 21/32 345/156 |

(Continued)

*Primary Examiner* — Nam V Nguyen
(74) *Attorney, Agent, or Firm* — Jenei LLC

(57) ABSTRACT

A communication system and method are provided for remotely reproducing a touch pattern or gesture as a vibrotactile output. At a touch screen, a first user device receives a touch pattern by a first user, characterizes the touch pattern as a touch pattern data based upon time and intensity of touch at a plurality of array points of the touch screen, and communicates the touch pattern data to a network. A tactile array of micro-vibratory devices is attached to a garment and worn by a second user. The touch pattern data is wirelessly received from the first user device via the network. Vibration of selected micro-vibratory devices of the tactile array is modulated in timing and intensity in response to the touch pattern data to reproduce the touch pattern.

20 Claims, 4 Drawing Sheets

(51) Int. Cl.
  *G08B 6/00*      (2006.01)
  *G08C 17/02*     (2006.01)
  *A61H 19/00*     (2006.01)
  *G06F 21/30*     (2013.01)
  *G06F 3/0488*    (2013.01)
  *G06F 1/16*      (2006.01)
  *G06F 3/0484*    (2013.01)
  *H04M 1/725*     (2006.01)

(56) References Cited

U.S. PATENT DOCUMENTS

| | | | | |
|---|---|---|---|---|
| 7,608,037 B2 * | 10/2009 | Levy | | A61H 19/44 600/38 |
| 7,967,679 B2 * | 6/2011 | Ombrellaro | | A63F 13/02 463/30 |
| 8,279,053 B2 * | 10/2012 | Ryu | | G06F 3/016 340/4.1 |
| 8,279,193 B1 * | 10/2012 | Birnbaum | | G06F 3/016 340/407.2 |
| 8,362,883 B2 * | 1/2013 | Hale | | G09B 21/003 340/407.1 |
| 8,527,041 B2 * | 9/2013 | Crompvoets | | A61B 5/02438 600/509 |
| 8,760,413 B2 * | 6/2014 | Peterson | | G06F 3/016 200/600 |
| 8,909,357 B2 * | 12/2014 | Rawls-Meehan | | A47C 20/041 700/17 |
| 8,941,476 B2 * | 1/2015 | Hill | | G06F 3/016 116/200 |
| 9,031,673 B2 * | 5/2015 | Rawls-Meehan | | A47C 20/041 700/19 |
| 9,298,260 B2 * | 3/2016 | Karaoguz | | G06F 3/016 |
| 9,436,282 B2 * | 9/2016 | Levesque | | G06F 3/016 |
| 2010/0261530 A1 * | 10/2010 | Thomas | | A63F 13/06 463/36 |
| 2010/0328051 A1 * | 12/2010 | Hale | | G09B 21/003 340/407.1 |
| 2011/0102332 A1 * | 5/2011 | Birnbaum | | G06F 3/014 345/173 |
| 2012/0218090 A1 * | 8/2012 | Rothschild | | G08B 6/00 340/407.1 |
| 2012/0286944 A1 * | 11/2012 | Forutanpour | | G06F 3/04847 340/407.1 |
| 2013/0331745 A1 * | 12/2013 | Sedic | | A61H 19/34 601/46 |
| 2016/0086457 A1 * | 3/2016 | Baron | | G08B 6/00 340/407.1 |

\* cited by examiner

GARMENT WITH REMOTE CONTROLLED VIBRATION ARRAY

CROSS-REFERENCE TO RELATED APPLICATION

This application claims priority or the benefit of U.S. Provisional Application 61/798,854, filed Mar. 15, 2014 and of U.S. Provisional Application 61/814,701 filed Apr. 22, 2013, the contents of which are fully incorporated herein by reference.

BACKGROUND OF THE INVENTION

1. Field of the Invention

The field of art disclosed herein pertains to vibratory stimulation devices that are remotely actuated using a device interface for translation of gestures. A user can provide inputs to a touch interface with or without needing to view the interface to achieve the desired response from the remotely controlled vibration array device

2. Description of the Related Art

Remotely controlling a stimulation device can be relegated to sexual toys but may also be helpful in improving perception, function, learning, training in any situation that requires a sensory stimulus.

Vibrating sex toys, also known as "vibrators", are typically equipped with fader-style controls that allow a user to vary the intensity of an electric vibrator motor, thereby altering the sensations produced by the toy. Unfortunately, controls in a vibrator sex toy are not optimal because they are distractions from the very sensations they control and are not controlled remotely. A more natural and ergonomic method of controlling a massaging or vibrator sex toy in a remote fashion is sought.

Sensory feedback is sought in a variety of methods with sensors that allow for identification of everything from grip on a steering wheel to application of force though a tennis racquet for a professional athlete. The ability to remotely deliver signals to the user of the tennis racquet or steering wheel is sought.

SUMMARY OF THE INVENTION

Disclosed are communication system and a method for reproducing a touch pattern or gesture by a first user received on a first user device on a second user device that includes a tactile array attached to a garment worn by a second user.

According to one aspect, a communication system comprises a first user device having a touch screen to receive a touch pattern by a first user and to characterize the touch pattern as a touch pattern data based upon time and intensity of touch at a plurality of array points of the touch screen. The first user device has a communication interface to communicate the touch pattern data to a network. A second user device comprises a tactile array of micro-vibratory devices attachable to a garment, a communication receiver to wirelessly receive the touch pattern data from the first user device via the network, and a vibrotactile controller responsive to the received touch pattern data to modulate timing and intensity of vibration of selected micro-vibratory devices of the tactile array to reproduce the touch pattern.

According to another aspect, a method for remotely reproducing a touch pattern or gesture as a vibrotactile output. At a touch screen, a first user device receives a touch pattern by a first user, characterizes the touch pattern as a touch pattern data based upon time and intensity of touch at a plurality of array points of the touch screen, and communicates the touch pattern data to a network. A tactile array of micro-vibratory devices is attached to a garment and worn by a second user. The touch pattern data is wirelessly received from the first user device via the network. Vibration of selected micro-vibratory devices of the tactile array is modulated in timing and intensity in response to the touch pattern data to reproduce the touch pattern.

These and other features are explained more fully in the embodiments illustrated below. It should be understood that in general the features of one embodiment also may be used in combination with features of another embodiment and that the embodiments are not intended to limit the scope of the invention.

BRIEF DESCRIPTION OF THE FIGURES

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
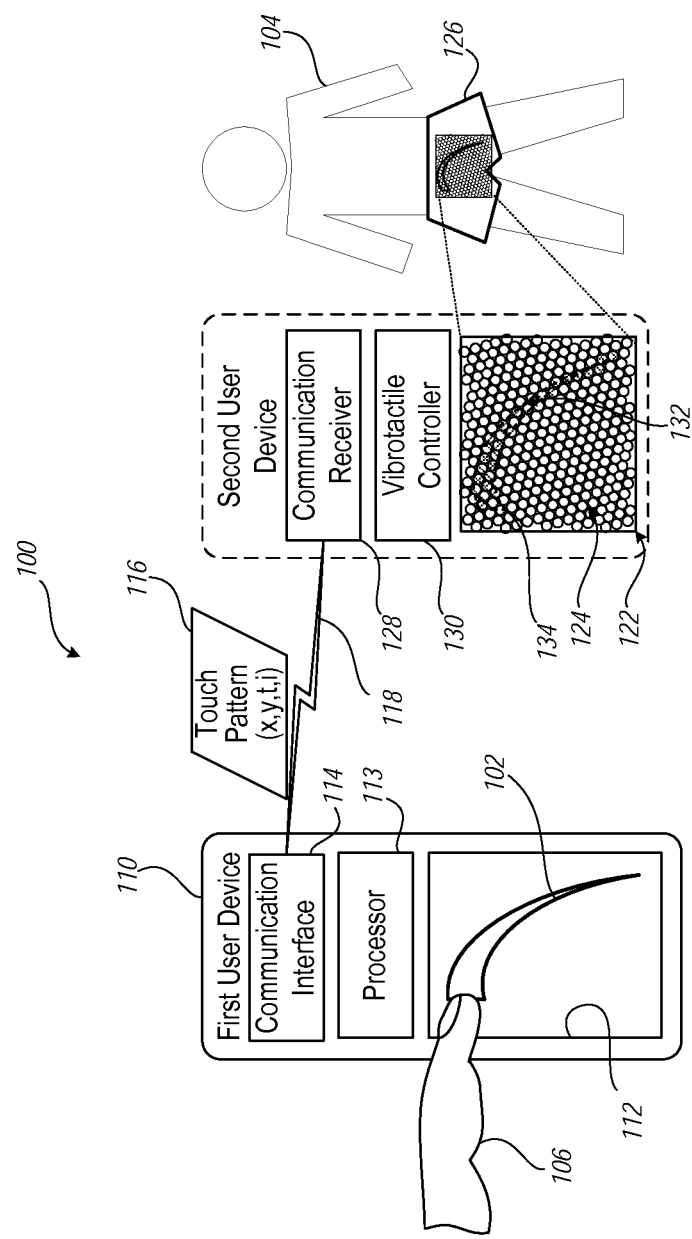
FIG. 1 illustrates a block diagram of an example communication system for remotely communicating vibrotactile interaction within which various aspects of the disclosure can be implemented, according to one or more embodiments.

The present invention relates to a stimulatory device with a plurality of sensory nodes placed adjacent to the skin. The device can be used for sexual or nonsexual communication with another individual. Control of the device is achieved with multiple possible sources including Bluetooth (BT), wireless, or remote control actions. The device allows for access to any combination of nodes that is determined remotely by the controller of the device. The wearer of the sensory nodes would feel one or multiple nodes activated remotely sequentially or in patterns determined by the controller. Levels of activity of the nodes would be determined by the controller; therefore defining the strength of the stimulus. Patterns would simulate touch, poke, push or stroke and would be developed by the controller of the device.

A gesture can refer to a predefined movement across the touch screen of a device, such as a mobile telephone. An example of a gesture is a swipe of a finger from corner-to-corner of the touch screen. This gesture, or others like it, can trigger the device to perform a particular function, such as performing a search on the device. Other programs also employ gesture-based control. For example, the FIREFOX Web browser can be configured, using third-party plug-ins, to react to commands input by predefined mouse gestures.

Current devices are able to provide a pattern of stimulus that is related to the programming of the mechanical device. Whether the device is vibratory, electric or pressure, the determined action is a single, single continuous, or alternating and/or sequential action that is predetermined. This allows the user to have a response or action based upon a finite set of stimulus. The controller of the current device is usually the individual him/herself or in the case of a remote access, usually a nearby partner that is able to use basic functionality of duration, number or timing of sequences.

The devices that are used for stimulation include various sexual devices for the male and female, massagers, entertainment mechanisms (such as chairs) that allow spectators to feel alterations in the device that correlate to and reflect visual stimuli (i.e. movie scenes). Additional usage of the device could be for training athletes, adjusting motions or activities for military operation, nonverbal communication for soldiers or musicians, application to the handicapped especially the hearing or visually impaired to allow more complete experiences for multiple venues.

The present invention is able to allow the operator to create an infinite number of translated stimuli with the use of multiple nodes of response and variations in the responses. The simulation of touch can be done through processors that allow for the action reflexively to be translated in the multiple stimulation receivers in the end device.

Turning now to the Drawings, the detailed description set forth below in connection with the appended drawings is intended as a description of various configurations and is not intended to represent the only configurations in which the concepts described herein may be practiced. The detailed description includes specific details for the purpose of providing a thorough understanding of various concepts with like numerals denote like components throughout the several views. However, it will be apparent to those skilled in the art that these concepts may be practiced without these specific details. In some instances, well-known structures and components are shown in block diagram form in order to avoid obscuring such concepts.

With initial reference to FIG. 1, a communication system 100 according to at least one aspect of the present disclosure enables remote reproduction of a touch pattern 102 (gesture) on a second user 104 (touch recipient) by a first user 106 (touch generator). A first user device 110 has a haptic input device, depicted as a touch screen 112, to receive the touch pattern 102 by the first user 106. A processor 113 of the first user device characterizes the touch pattern 102 as a function of time and intensity of touch at each of a plurality of array or pixel points of the touch screen 112. A communication interface 114 of the first user device 110 communicates touch pattern data 116 based on the characterization of the touch pattern 102 to a network 118.

A second user device 120 used by the second user 104 includes a tactile array 122 of micro-vibratory devices 124 that are attachable (i.e., temporarily or permanently) to a worn item, depicted as a garment 126. It should be appreciated that the garment 126 provides holds the tactile array 122 in contact with the skin of the second user 104. A communication receiver 128 wirelessly receives touch pattern data 116 from the first user device 110 via the network 118. A vibrotactile controller 130 responds to the received touch pattern data 116 to by modulating timing and intensity of vibration of selected micro-vibratory devices 132 of the tactile array 122 to generate a reproduction touch pattern 134.

The vibratory motors or other technology can be arranged in any practical arrangement such that the touch screen gestures are translated into multi-dimensional vibrations across the array. Actuators that apply forces to the skin for touch feedback, and controllers enable Haptics. The actuator provides mechanical motion in response to an electrical stimulus. Most early designs of haptic feedback use electromagnetic technologies such as vibratory motors, like a vibrating alert in a cell phone or a voice coil in a speaker, where a central mass is moved by an applied magnetic field. These electromagnetic motors typically operate at resonance and provide strong feedback, but produce a limited range of sensations and typically vibrate the whole device, rather than an individual section. Second generation haptics offered touch-coordinate specific responses, allowing the haptic effects to be localized to the position on a screen or touch panel, rather than the whole device. Second generation haptic actuator technologies include electroactive polymers, piezoelectric, electrostatic and subsonic audio wave surface actuation. Third generation haptics deliver both touch-coordinate specific responses and customizable haptic effects. The customizable effects can be created using low latency control chips. A new technique that does not require actuators is called reverse-electrovibration. A weak current is sent from a device on the user through the object they are touching to the ground. The oscillating electric field around the skin on their fingertips creates a variable sensation of friction depending on the shape, frequency, and amplitude of the signal.

Figure 2:
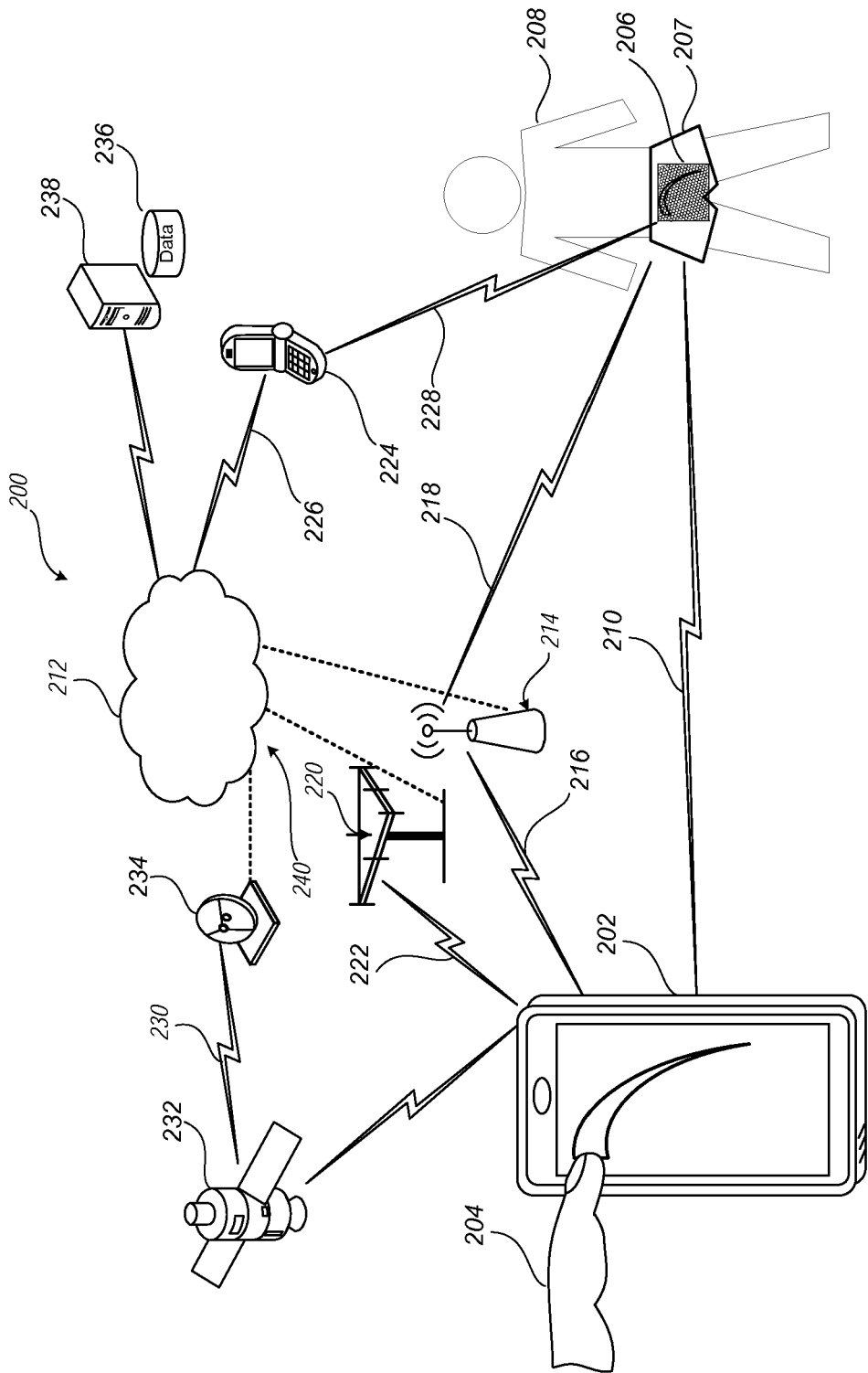
FIG. 2 illustrates a block diagram of another example communication system utilizing multi-modal network protocols in accordance with one or more embodiments.

Referring to FIG. 2, a communication system 200 for remote tactile interaction in accordance with the present disclosure is illustrated. The communication system 200 is an exemplary version of the communication system 100 (FIG. 1). The communication system 200 includes a mobile device 202 (first user device) used by a first user 204 and a vibrotactile device 206 (second user device) configured to be worn on a garment 207 at least in part by a user 208. For example, a direct network 210 may be formed between the mobile device 200 and the vibrotactile device 206. For instance, the direct network 210 can be a wireless ad hoc network, a peer-to-peer network, a personal access network (PAN), etc.

Alternatively, a hosted network 212 can facilitate communication from the mobile device 202 to the vibrotactile device 206. For example, the communication can be carried at least in part over a wireless access network (WLAN) 214, such as with the mobile device 202 as depicted at 216 or with the vibrotactile device 206 as depicted at 218. Alternatively or in addition, communication may be conveyed at least in part via a cellular or Wireless Wide Area Network (WWAN) 220, such as with the mobile device 202 as depicted at 222 or with the vibrotactile device 206. In an exemplary aspect, the latter is depicted as a second mobile device 224 that receives communication over a cellular or WWAN link 226 and relays via a short-range wireless signal 228 to the vibrotactile device 206. Alternatively or in addition, communication over the communication system 200 can be convey at least in part via a satellite network 230, depicted as a satellite 232 that relays communication from the mobile device 202 to a ground station 234. The communication system 200 can also access support processing, such as handling subscriber information 236 managed at a server 238. Portions of the communication system 200 can also be hard wired, such as depicted at 240.

An advantageous development of the invention consists in producing the remote control or remote programming signals for the vibrator in a third apparatus, which can be a further mobile telephone. This may comprise one or more of an antenna, a central control unit, a control keyboard, a microphone, a loudspeaker and a working program memory.

Figure 3:
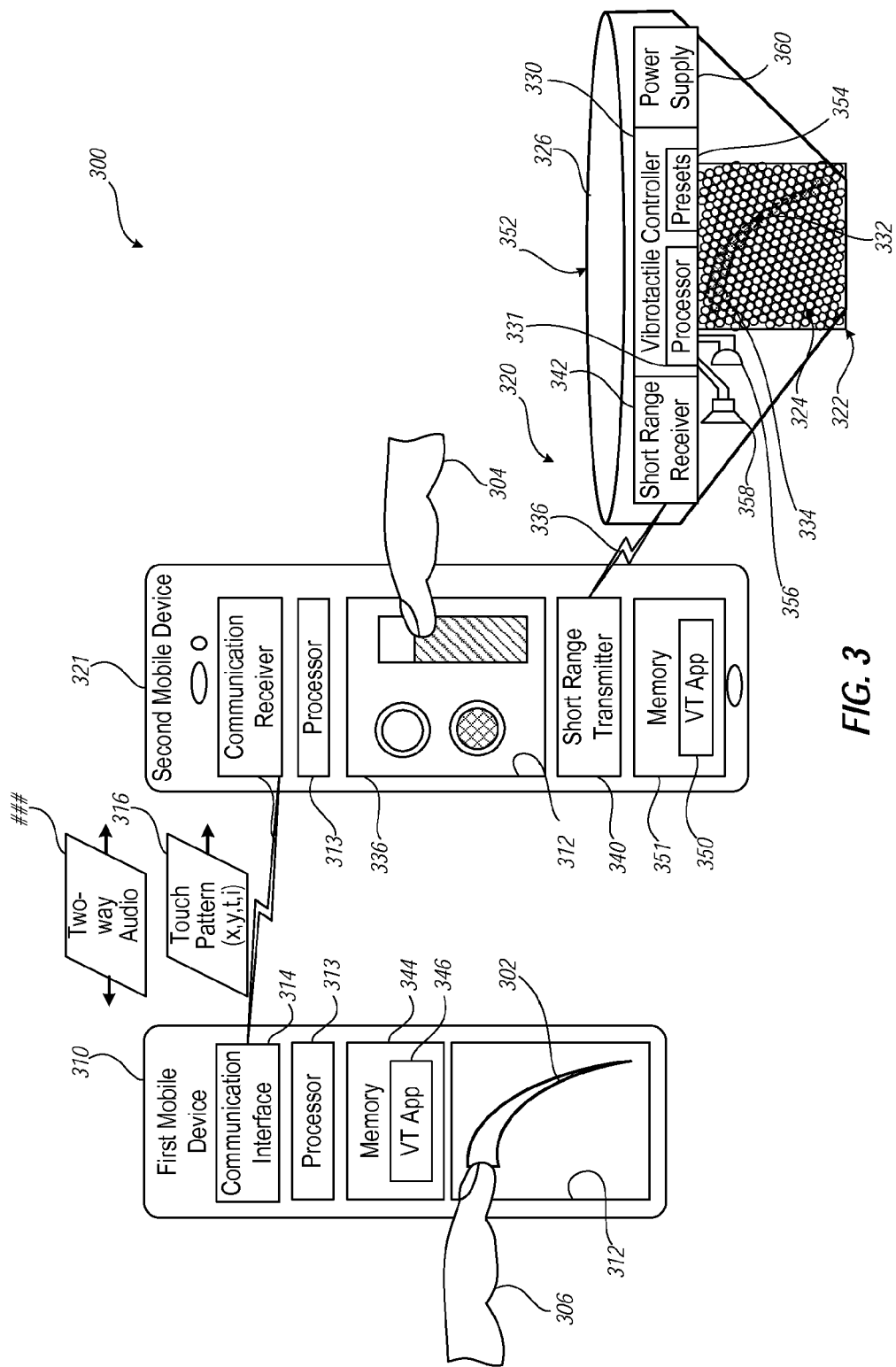
FIG. 3 illustrates a block diagram of an additional example communication system utilizing a distributed architecture for a user device that receives the vibrotactile interaction in accordance with one or more embodiments.

With initial reference to FIG. 3, a communication system 300 according to at least one aspect of the present disclosure enables remote reproduction of a touch pattern 302 (gesture) on a second user 304 (touch recipient) by a first user 306 (touch generator). A first user device, depicted as a first mobile device 310, has a haptic input device, depicted as a touch screen 312, to receive the touch pattern 302 by the first user 306. A processor 313 of the first mobile device characterizes the touch pattern 302 as a function of time and intensity of touch at each of a plurality of array or pixel points of the touch screen 312. A communication interface 314 of the first mobile device 310 communicates touch pattern data 316 based on the characterization of the touch pattern 302 to a network 318.

A second user device or apparatus 320 used by the second user 304 includes a second mobile device 321 and a tactile array 322 of micro-vibratory devices 324 that is attachable (i.e., temporarily or permanently) to a worn item, depicted as a garment 326. It should be appreciated that the garment 326 provides holds the tactile array 322 in contact with the skin of the second user 304. A communication receiver 328 wirelessly receives touch pattern data 316 from the first mobile device 310 via the network 318. A vibrotactile controller 330 responds to the received touch pattern data 316 to by modulating timing and intensity of vibration of selected micro-vibratory devices 332 of the tactile array 322 to generate a reproduction touch pattern 334. In one aspect, the touch screen gestures are translated into multi-dimensional vibrations across the array.

In one embodiment of the invention, a remotely controllable vibrator with the features according to the invention is provided. The advantages of the invention consist particularly in that a vibratory array is activatable not only by remote control aspect of the first mobile device 310, but that the second user 304 may also make certain control inputs remotely via the second mobile device 321, which can also make such control changes convenient and inconspicuous. For example, control commands can be fed to a vibratory micro-array 322 by way of a wireless interface 336, which selectively vary the intensity of the vibrations, and control commands, which influence the duration of the vibrations.

Alternatively or in addition, remote-programming commands can be fed to a vibrator by way of its wireless interface, which serve for programming or reprogramming the vibrator. In addition, a bidirectional signal transmission can take place by way of the wireless interface. The wireless transmission may be Wi-Fi, Bluetooth, cellular signal or other known transmission as depicted as a short range transmitter 340 of the second mobile device 321 and a short range receiver 342 attached to the garment 326.

Alternatively, the second mobile device 321 may be carried or affixed to the garment 326 and linked by a cable (not shown) to provide power to the vibratory micro-array 322 as well as control signals. Moreover, the proximity of the communication capabilities of the second mobile device 321 can be used for voice-activated controls and for bi-direction communication with the first mobile device 310.

In an exemplary aspect, the first mobile device 310 has a computer-readable memory device 344 that contains a vibrotactile application ("VT App") 346 that is executed by the processor 313 to perform one or more of the functions described herein. The second mobile device 321 similarly has a computer-readable memory device 348 that contains a VT App 350 that is executed by a processor 352 to perform one or more of the functions described herein. For example, the VT App 346 in the first mobile device 310 can be configured in a remote controller mode linked to the VT App 350 in computer readable memory device 351 in the second mobile device 321 that is configured in a remotely controlled mode as depicted. The VT Apps 346, 350 can coordinate bi-directional communication (e.g., voice, video, text, etc.) between the first and second mobile device 310, 321.

In one aspect, worn portions of the second user device, depicted as an integrated vibrating garment 352, serve as a user interface for the second user 304 and provide additional autonomous capabilities. For example, the integrated vibrating garment 352 can include a working program memory in which one or more vibrator working programs are stored, depicted as presets 354 accessed by the vibrotactile controller 330. The vibrotactile controller 330 can further include a microprocessor 331 and audio signal memory (not shown) used with one or more of a microphone 356, a speaker 358 and a power supply 360 to perform as a communication link.

In one aspect, the present disclosure provides for wearable products sold with an array of vibratory actuators or motors included that are controlled by touch screen gestures, which are translated to vibration sensations within the array. This allows translation of movements, gestures and pressures to the remote source in a similar two-dimensional manipulation of the gestures provided to the touch screen 312.

It should be appreciated with the benefit of the present disclosure that aspects of the present invention can extend to placements other than a garment worn in contact with the genitalia. In another embodiment, micro-vibration arrays are incorporated into pads or clothing for various parts of the body. For example, a shirt (or just a pad that covers all or part of the shoulders) can incorporate the micro-vibration array such that someone can manipulate a touch screen in one locale and affect a massage of proportional movement and pressures on the remote subject.

In another embodiment, the vibrator array comprises a microcontrollers central control element. This produces control signals for a resonator device, to which resonators belong. Each of these resonators is separately controllable by the microcontroller so that the strength and duration of the vibration is individually controllable for each of the resonators.

The vibrator is remotely controllable by means of the further touch screen wireless apparatus, particularly a mobile telephone. For example, control commands can be emitted by the mobile telephone, which influence the strength and duration of the vibrations of the resonator array of the vibrator. Moreover, the mobile telephone can also be used as a programming tool for the vibrator, which transmits to the vibrator programming commands, which serve for setting up or modification of a vibrator working program and are stored in the working program memory of the vibrator.

The received signals can be remote control commands by means of which the strength of the vibrations of the resonator array or the duration of the vibrations of the resonator array is influenced. Moreover, the received signals can be a selection command by means of which one of the working programs stored in the working program memory is selected and converted by the microcontroller into control commands for the resonator array. The received signals can moreover be a programming command, which is supplied to the working program memory of the vibrator.

The microcontroller is furthermore provided for the purpose of making available acknowledgement or response signals, which are transmitted by way of the wireless signal interface of the wireless signal connection to the mobile telephone. These acknowledgement or response signals can be signals which were received by the microphone, signals which were derived from the audio signal memory or signals which were generated by the microcontroller itself, for example in the sense of a program dialogue or in the sense of a transmission of a charging state signal for the battery.

In accordance with the afore-described form of embodiment a mobile telephone, which has a wireless signal interface, is accordingly used for the purpose of transmitting wire-free control and/or programming commands by way of a bidirectional wireless signal connection to a vibrator similarly provided with a wireless signal interface. The vibrator is provided with a microcontroller, which is in a position of sending back acknowledgement or response signals to the mobile telephone.

The device can be applied to clothing, bed sheets, shoes, gloves, sports handles, steering wheel covers, or sexual devices that can be inserted into or placed outside of sexual organs. The end action that is developed in the device can include temperature, vibration, electrical stimulus, sound, or a combination of the above.

Consistent with at least one aspect of the present disclosure, an apparatus can be worn by a male user for providing sexual stimulus from the partner of the user. The apparatus comprises one or multiple vibrating or stimulating elements that are supported in a fabric architecture. The garment has a cup and supportive design that allows for the support of the male genitalia. The vibration device is anatomically suited for the male subject with actuating stimulators in multiple sites around and behind the cup. Stimulation will be able to be done through remote means using cellphone, wireless, infrared, or Bluetooth technology.

Consistent with another aspect of the present disclosure, vibrating panty also known as vibrating thong or vibrating undies is a type of clitoral hands-free vibrator that is used mainly by female users with the purpose to receive sexual stimulation. Male versions of the device have been difficult because of anatomic changes in the penis during stimulation that prevents consistent stimulation in appropriate areas of the genitalia. The female sex toy features the conjunction of a female piece of lingerie and a vibrating element inserted. The vibrating bullet or some other shaped elements is located against the female genitalia: clitoris and labia, but there are also some penetrative sex toys attached from the inner side of the panties for stimulating the vaginal erogenous zones. The panties are intended for keeping the vibrator in place, while activating and in many cases for wearing it comfortably under the clothes. A slightly raised area may be provided to enhance contact with specific body regions such as the clitoral region of the wearer.

There are the following types of vibrating panties that are produced by the sex toys industry:

Remote control vibrating panty: This is a discreet vibrator operated from a remote control device that can usually work at the distance of up to several meters. The panties' vibrator is controlled by users or by their partners during foreplay or during masturbation. Some women wear the remote control panties under their clothes and turn the vibrating bullet on wherever they wish. Usually such models are designed noiseless for hiding the sound of vibrating element.

Crotchless vibrating panty. This model is designed for using during the intercourse. The crotchless panties are intended for easy access to the genitalia, with a vibrating bullet massaging the clitoris. Vibrating panty with removable bullet. Some vibrating elements of the panties are designed for removing and using in any other erotic activities. The bullet is inserted into a special hidden pouch placed in the inner side of the panties. But there are also attachable bullets used with any panties, thongs or G-strings. Generally, small batteries, such as watch batteries, operate the bullet. Vibrating panties are usually made out of the normal fabrics used in manufacturing the female lingerie: nylon, cotton, mesh, lace, leather, etc., as well as latex. In all cases the material is stretchable to fit many sizes and comfortable for wearing for extended periods of time. Description of the product: The male vibrating undergarment is comprised of flexible woven material back panels with an anterior cup architecture. The front of the garment is composed of flexible woven mesh reinforced with a fibrous netting that allows the genitalia of the male to be separated from the body of the undergarment without major compression against the body with additional separation of the penis and scrotum. The vibration nodes are interspersed behind the cup and the main body of the underwear in an area that would be behind the scrotal mass and along the base of the penis in front of the scrotum. Stimulation would be consistently in areas that would not significantly change with penile engorgement.

Figure 4:
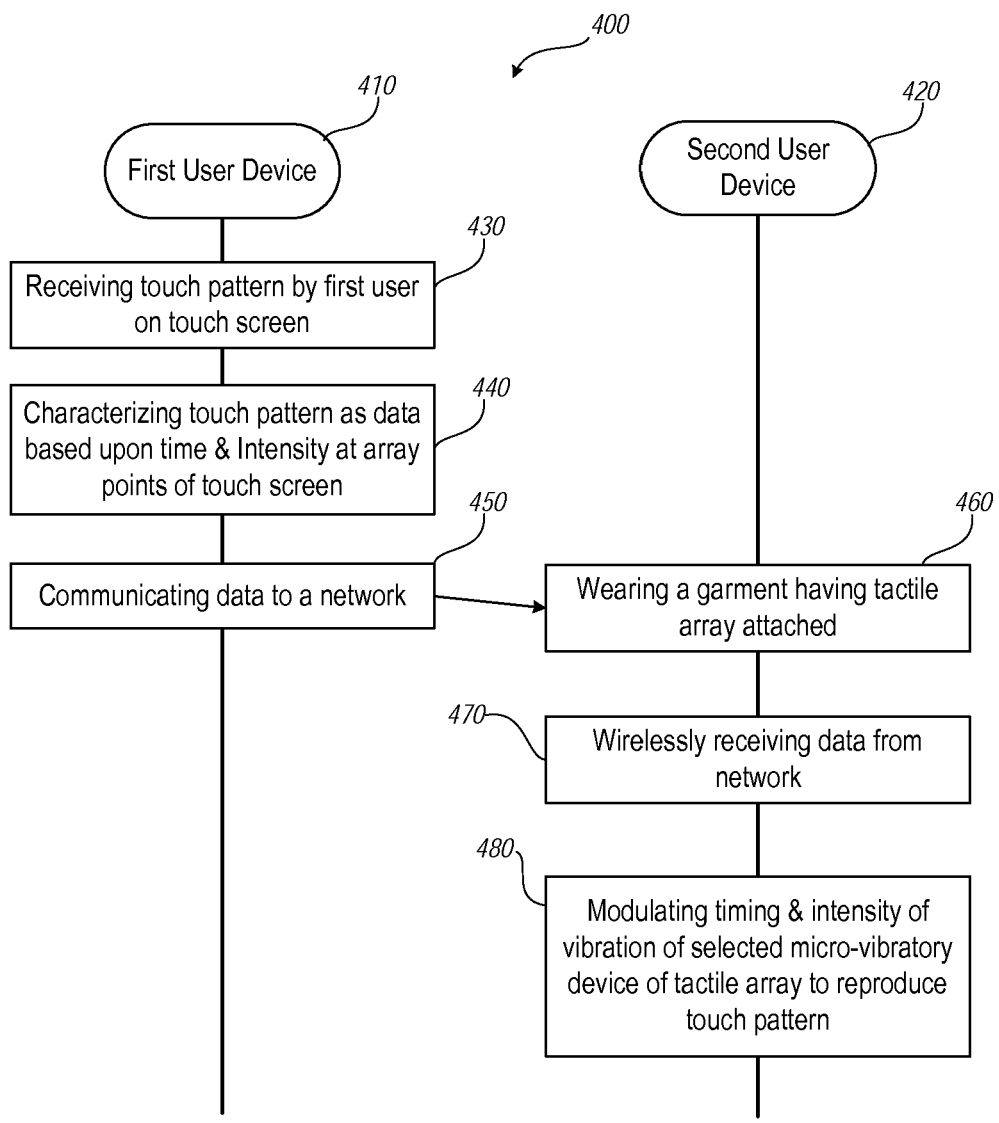
FIG. 4 is a flow chart illustrating a method for remote vibrotactile interaction in accordance with one or more embodiments.

Turning to FIG. 4, a method 400 is provided for remotely reproducing a touch pattern or gesture input at a first user device 410 as a vibrotactile output at a second user device 420. At a touch screen of the first user device, a touch pattern by a first user is received (block 430). The first user device 410 characterizes the touch pattern as a touch pattern data based upon time and intensity of touch at a plurality of array points of the touch screen (block 440). The first user device 410 communicates the touch pattern data to a network (block 450).

In block 460, a second user wears attached to a garment a tactile array of micro-vibratory devices as at least a part of the second user device 420. The touch pattern data is wirelessly received from the first user device via the network (block 470). The second user device 420 modulates timing and intensity of vibration of selected micro-vibratory devices of the tactile array in response to the touch pattern data to reproduce the touch pattern (block 480).

The device may also communicate audibly using audio codec, which may receive spoken information from a user and convert it to usable digital information. Audio codec may likewise generate audible sound for a user, such as through a speaker, e.g., in a handset of device. Such sound may include sound from voice telephone calls, may include recorded sound (e.g., voice messages, music files, etc.) and may also include sound generated by applications operating on device. This device may optionally include a GPS receiver chipset or other location-determining subsystem.

Another advantageous development of the invention consists in additionally equipping the device with a temperature sensor that is connected with the microcontroller. This allows detection and recording of data relating to the monthly cycle of a woman or for indicating states of arousal. These data can be transmitted by way of the wireless signal connection BT to the mobile telephone and represented on the display thereof The computing device may be implemented in a number of different forms, as shown in the figure. For example, it may be implemented as a cellular telephone. It may also be implemented as part of a smartphone, personal digital assistant, or other similar mobile device. Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Device functions other than those described herein may be controlled via gestures. Elements of different implementations described herein may be combined to form other implementations not specifically set forth above. Elements may be left out of the processes, computer programs, Web pages, etc. described herein without adversely affecting their operation. Furthermore, various separate elements may be combined into one or more individual elements to perform the functions described herein.

In the above-described flow chart, one or more of the methods may be embodied in a computer readable device containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

All publications, patents and patent applications cited herein, whether supra or infra, are hereby incorporated by reference in their entirety to the same extent as if each individual publication, patent or patent application was specifically and individually indicated as incorporated by reference. It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

It must be noted that, as used in this specification and the appended claims, the singular forms "a," "an" and "the" include plural referents unless the content clearly dictates otherwise. Thus, for example, reference to a "colorant agent" includes two or more such agents.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

As will be appreciated by one having ordinary skill in the art, the methods and compositions of the invention substantially reduce or eliminate the disadvantages and drawbacks associated with prior art methods and compositions.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

While it is apparent that the illustrative embodiments of the invention herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present invention.

What is claimed is:

1. A communication system for remote vibrotactile interaction, comprising:
    a first user device comprising:
        a touch screen to receive a nonverbal multivariate touch pattern by a first user and to characterize the touch pattern as a touch pattern data of a human gesture based upon time and intensity of touch at a plurality of array points of the touch screen, and
        a communication interface to communicate the touch pattern data to a network; and
    a second user device, comprising:
        a garment that is shaped to contact genitalia of a wearer;
        a tactile array of micro-vibratory devices attachable to a portion of the garment in contact with the genitalia of the wearer,
        a communication receiver to wirelessly receive the touch pattern data from the first user device via the network, and
        a vibrotactile controller responsive to the received touch pattern data to modulate timing and intensity of vibration of selected micro-vibratory devices of the tactile array to proportionally reproduce the nonverbal multivariate touch pattern of the human gesture.

2. The communication system of claim 1, wherein the first user device comprises a first mobile communication device, and wherein the second user device comprises a second mobile device and an integrated vibrator garment in wireless communication with the second mobile device.

3. The communication system of claim 2, wherein the integrated vibrator garment further comprises a two-way audio communication system.

4. The communication system of claim 2, wherein the second mobile device comprises a user interface control to wirelessly control the integrated vibrator garment.

5. The communication system of claim 4, wherein the user interface control comprises a value that is proportional to the touch pattern by the first user for strength of vibration, intensity of vibration, change in intensity of vibration, duration of vibration or combinations thereof.

6. The communication system of claim 5, wherein the user interface control comprises a value for touch patterns, which simulate touch, poke, push, stroke, or combination thereof.

7. The communication system of claim 1, wherein the garment comprises a conforming material to hold the tactile array into physical contact with skin of the second user.

8. The communication system of claim 1, wherein:
    the integrated vibrator garment further comprises a temperature sensor to detect a body temperature value;
    the second user device further comprises a communication interface to wirelessly communicate the body temperature value over the network to the first user device; and
    the first user device displays information related to the body temperature value.

9. The communication system of claim 1, wherein:
    the touch screen of the first user device receives the nonverbal multivariate touch pattern touch pattern as a function of time by the first user; and
    the vibrotactile controller proportionally reproduces the two-dimensional touch pattern according to the function of time.

10. The communication system of claim 1, wherein the garment comprises a cup and supportive design that allows for support of the male genitalia and contains the tactile array of micro-vibratory devices.

11. The communication system of claim 1, wherein the garment comprises a clitoral hands-free vibrator device that contains the tactile array of micro-vibratory devices.

12. The communication system of claim 1, wherein the garment comprises a penetrative sex toy device inwardly attached to the garment that contains the tactile array of micro-vibratory devices.

13. A method for remotely reproducing a touch pattern or gesture as a vibrotactile output, the method comprising:
   at a touch screen of a first user device,
      receiving a nonverbal multivariate touch pattern of a human gesture by a first user,
      characterizing the touch pattern as a touch pattern data based upon time and intensity of touch at a plurality of array points of the touch screen, and
      communicating the touch pattern data to a network; and
   at tactile array of micro-vibratory devices attached to a portion of a garment in contact with genitalia when worn by a second user,
      wirelessly receiving the touch pattern data from the first user device via the network,
      modulating timing and intensity of vibration of selected micro-vibratory devices of the tactile array in response to the touch pattern data to proportionally reproduce the nonverbal multivariate touch pattern of the human gesture.

14. The method of claim 13, further comprising:
   receiving the touch pattern by the first user on a touch screen of a first mobile device;
   communicating the touch pattern data to the network comprising a wireless wide area network;
   receiving the touch pattern data at a second mobile device of the second user;
   wirelessly relaying the touch pattern data to an integrated vibrator garment comprising the tactile array; and
   wirelessly receiving the touch pattern data at the integrated vibrator garment.

15. The method of claim 14, further comprising:
   transmitting two-way audio communication between the first mobile device and the integrated vibrator garment relayed by the second mobile device.

16. The method of claim 14, further comprising:
   receiving a control input by the second user at the second mobile device; and
   wirelessly communicating the control input from the second mobile device to the integrated vibrator garment.

17. The method of claim 16, wherein the control input comprises a value for strength of vibration that is proportional to the touch pattern by the first user.

18. The method of claim 16, wherein the control input comprises a value for duration of vibration that matches the duration of the touch pattern by the first user.

19. The method of claim 13, wherein the garment comprises a conforming material to hold the tactile array into physical contact with skin of the second user.

20. The method of claim 13, further comprising:
   detecting a body temperature value by a temperature sensor connected to integrated vibrator garment;
   wirelessly communicating the body temperature value over the network to the first user device;
   displaying information related to the body temperature value on the first user device.

* * * * *